(12) United States Patent
Garotta

(10) Patent No.: US 8,103,452 B2
(45) Date of Patent: Jan. 24, 2012

(54) CORRECTION METHOD FOR PROCESSING SEISMIC TRACES

(75) Inventor: Robert Garotta, Gonfaron (FR)

(73) Assignee: CGGVeritas Services SA, Massy (FR)

( * ) Notice: Subject to any disclaimer, the term of this patent is extended or adjusted under 35 U.S.C. 154(b) by 762 days.

(21) Appl. No.: 11/792,566

(22) PCT Filed: Dec. 14, 2005

(86) PCT No.: PCT/EP2005/056789
§ 371 (c)(1),
(2), (4) Date: Jun. 7, 2007

(87) PCT Pub. No.: WO2006/064023
PCT Pub. Date: Jun. 22, 2006

(65) Prior Publication Data
US 2008/0172180 A1    Jul. 17, 2008

(30) Foreign Application Priority Data

Dec. 14, 2004 (FR) ..................... 04 13260

(51) Int. Cl.
*G01V 1/16* (2006.01)
*G01V 1/22* (2006.01)
*G06F 13/00* (2006.01)
*G06F 13/10* (2006.01)

(52) U.S. Cl. ............. 702/14; 702/18; 702/179; 702/182

(58) Field of Classification Search ................. 702/1, 13, 702/14, 17, 18, 106, 189, 193; 342/159; 348/607; 367/31, 40, 52, 73, 75; 703/5
See application file for complete search history.

(56) References Cited

U.S. PATENT DOCUMENTS

| | | | | |
|---|---|---|---|---|
| 4,203,161 A * | 5/1980 | Johnson et al. | ................. | 367/40 |
| 4,858,201 A * | 8/1989 | Goins et al. | ..................... | 367/75 |
| 5,583,825 A * | 12/1996 | Carrazzone et al. | ............ | 367/31 |
| 5,586,082 A * | 12/1996 | Anderson et al. | ............... | 367/73 |
| 5,684,754 A * | 11/1997 | Byun et al. | ..................... | 367/52 |

* cited by examiner

*Primary Examiner* — Mohamed Charioui
*Assistant Examiner* — Felix Suarez
(74) *Attorney, Agent, or Firm* — Potomac Patent Group PLLC

(57) ABSTRACT

This invention relates to a method for processing seismic data comprising a collection of seismic traces with different offsets, comprising the steps of: a) breaking up one or several first trace(s) of the collection of seismic traces into a series of trace segment's according to a predetermined segmentation interval; b) defining a series of expansion coefficients, each expansion coefficient being associated with a segment of the first trace or traces; c) applying the associated expansion coefficient to each segment of the first trace or traces; d) comparing the first trace or traces thus expanded with a second trace from the collection of seismic traces to evaluate their similarity; e) repeating steps b), and d) with a new series of expansion coefficients, f) determining an optimum series of expansion coefficients that maximizes the similarity between the first expanded trace and the second trace in order to obtain one or several corrected first trace(s).

17 Claims, 7 Drawing Sheets

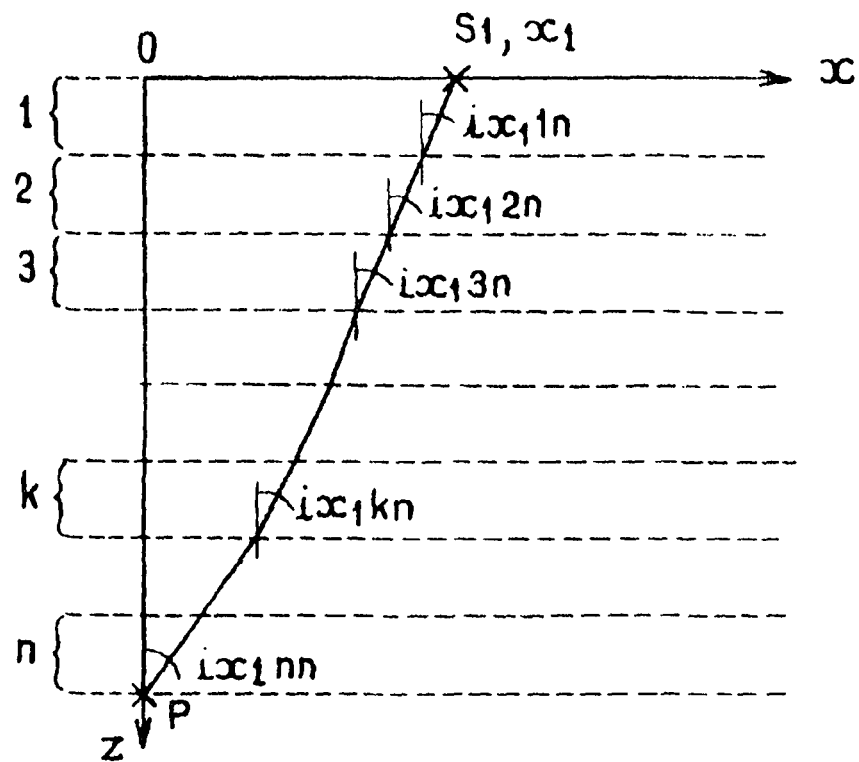
FIG_10
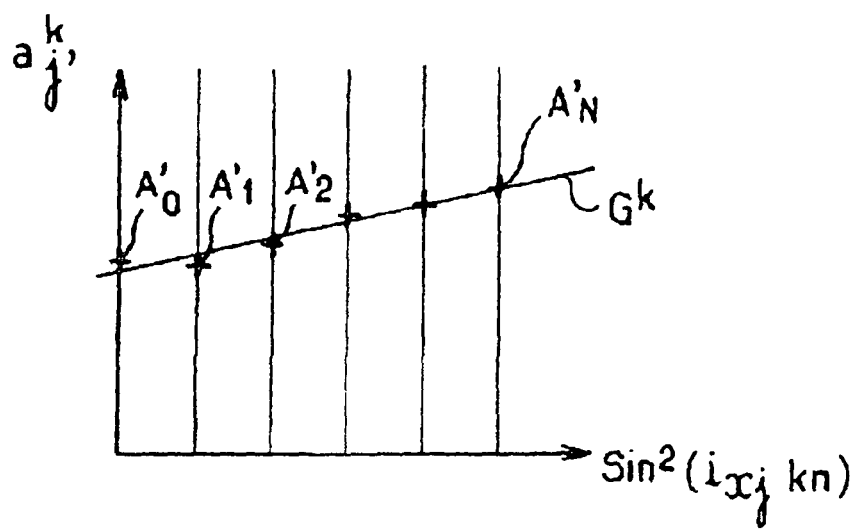
FIG_11

CORRECTION METHOD FOR PROCESSING SEISMIC TRACES

CROSS-REFERENCE TO RELATED APPLICATIONS

This national phase application is based on PCT/EP2005/056789 filed on Dec. 14, 2005 which claims priority to French Application No. 0413260 filed Dec. 14, 2004 entitled "Correction Method for Processing Seismic Traces."

STATEMENT REGARDING FEDERALLY-SPONSORED RESEARCH OR DEVELOPMENT

N/A

NAMES OF THE PARTIES TO A JOINT RESEARCH AGREEMENT

N/A

INCORPORATION-BY-REFERENCE OF MATERIAL SUBMITTED ON A COMPACT DISK

N/A

BACKGROUND OF THE INVENTION

1. Field of the Invention

The invention relates to the field of seismic data processing. More precisely, it relates to the inversion of seismic data.

2. Description of the Related Art

In general, for seismic exploration, a plurality of sources and receivers are distributed at ground level and at a distance from each other. The seismic sources are activated to generate seismic waves that are propagated in the subsurface. These seismic waves undergo deviations during their propagation. They are refracted, reflected and diffracted at the interfaces of the subsurface. Certain waves propagated in the subsurface are detected by seismic receivers and recorded in real time in the form of signals (called traces). The recorded traces can be processed to obtain an image of the subterranean geological structures.

During processing, the summing step (or stacking) consists of adding together the traces corresponding to seismic waves that are reflected at a same point in the subsurface. This step makes it possible to increase the signal-to-noise ratio and the primary-reflections-to-multiple-reflections ratio in the seismic data processed.

Starting from the assumption of a subsurface that is horizontally stratified without lateral variation of propagation velocities, it can be shown that the traces having the property of illuminating the same point of the subsurface for variable source-receiver distances (or offset) are those having the same mid-point in common between source and receiver.

However, the waves reflected in the subsurface are recorded at variable times according to the offset. Before adding the traces, it is therefore necessary to correct these traces to reduce them to a common reference, the zero offset trace. This correction is carried out during a step called NMO (Normal Move Out) correction.

The NMO step requires prior knowledge of a model for propagation velocities of seismic waves in the subsurface.

For example, the Dix model is based on the assumption that the subsurface is formed of horizontal layers or strata in which each layer is isotropic and has an associated given propagation velocity (interval velocity). The NMO correction relies on the model thus defined to correct the arrival time of a reflection recorded with a given offset x by bringing it to the theoretical time $\tau_0$ at which it would have been recorded with a zero offset x=0.

Given that the velocities are not known a priori, the correction step is carried out on the seismic traces by sweeping a range of velocities. Next, only the velocity optimising the semblance of the traces as a whole is retained.

Thus it is possible, in the most favourable cases, to deduce an estimate of the interval velocities between the highest energy events reflected.

In general the estimation of interval velocities does not take into account the anisotropy of the subsurface, that is to say the variation of velocity in the layers as a function of the propagation direction.

Moreover, neither does the estimate of interval velocities take into account the variation in reflectivity of the subsurface interfaces as a function of the angle of incidence of the wave.

BRIEF SUMMARY OF INVENTION

An aim of the invention is to propose a method for processing seismic data making it possible to obtain more precise information about the properties of the subsurface than the methods of prior art.

This problem is solved in accordance with the present invention by a method for processing seismic data comprising a collection of seismic traces with different offsets, comprising the steps consisting of:

a) breaking up one or several first trace(s) of the collection of seismic traces into a series of trace segments according to a predetermined segmentation interval;

b) defining a series of expansion coefficients, each expansion coefficient being associated with a segment of the first trace or traces;

c) applying the associated expansion coefficient to each segment of the first trace or traces;

d) comparing the first trace or traces thus expanded with a second trace from the collection of seismic traces to evaluate their similarity;

e) repeating steps b), c) and d) with a new series of expansion coefficients, and f) determining an optimum series of expansion coefficients that maximizes the similarity between the first expanded trace or traces and the second trace in order to obtain one or several corrected first trace(s).

According to the method of the invention, the NMO correction is carried out for each trace, segment by segment, with a predetermined arbitrary segmentation interval, and not on the basis of the highest energy events.

The method according to the invention allows a global optimisation of the expansions applied to the traces without privileging certain events.

The method according to the invention makes it possible to obtain information about the properties of the subsurface with a higher resolution than methods of prior art. The resolution of the obtained information is directly linked with the chosen segmentation interval. In particular, it makes it possible to deduce the following parameters:

local P wave velocity contrasts,
density contrasts of the subsurface,
S wave velocity contrasts,
anisotropy parameters of the subsurface.

In an embodiment of the method according to the invention, the predetermined segmentation interval is a multiple of the sampling interval for recording the first seismic trace.

Furthermore, the second trace can be a zero offset trace of the collection of seismic traces.

The second seismic trace can also be a trace of an offset immediately below the first seismic trace in the seismic traces collection.

Furthermore, the second seismic trace can itself be a corrected trace.

In an embodiment of the invention, the expansion coefficients series in step b) is defined according to an algorithm with random or pseudo-random selection.

In particular, the expansion coefficients series maximizing the similarity between the first expanded trace and the second trace can be determined by a Monte Carlo method.

In an embodiment of the invention, the comparison step d) comprises the correlation of the first expanded trace with the second trace.

In an embodiment of the invention, step d) comprises the determination of a cost function estimating the similarity between the first expanded trace and the second trace.

In an embodiment of the invention, steps a) to f) are applied to each trace or groups of traces from the seismic traces collection, to obtain a corrected collection of traces.

In particular, steps a) to f) can be applied by increasing order of trace offset.

Furthermore, the method can comprise a step g) consisting of deducing, from the optimum expansion coefficient series associated with each trace, a propagation velocity of a compressional (P) seismic wave in the subsurface as a function of depth.

In particular, step g) can advantageously include a ray tracing substep.

In an embodiment of the invention, the method includes a step h) consisting of deducing the density contrast data of the subsurface as a function of depth.

The method can also include a step i) consisting of deducing the propagation velocity of a shear (S) seismic wave as a function of depth.

The method can also include a step j) consisting of deducing the anisotropy parameters of a subsurface from the series of optimum expansion coefficients associated with a plurality of traces.

The invention also refers to an inversion method for seismic data comprising a collection of seismic traces with different offsets, comprising the steps of:

a) breaking up one or several first trace(s) of the collection of seismic traces into a series of trace segments according to a predetermined segmentation interval;

b) defining a series of expansion coefficients, each expansion coefficient being associated with a segment of the first trace or traces;

c) applying the associated expansion coefficient to each segment of the first trace or traces;

d) comparing the first trace or traces thus expanded with a second trace from the collection of seismic traces to evaluate their similarity;

e) repeating steps b), c) and d) with a new series of expansion coefficients;

f) determining an optimum series of expansion coefficients that maximizes the similarity between the first expanded trace and the second trace in order to obtain one or several corrected first traces.

g) deducing the values of seismic wave propagation velocities as a function of depth in the subsurface.

Other characteristics and advantages will become even clearer from reading the following description, given as a purely illustrative and non-limiting example, to be read with reference to the attached figures, amongst which;

BRIEF DESCRIPTION OF THE FIGURES

FIG. 10 shows diagrammatically the path of a seismic wave in the subsurface, FIG. 11 is a diagram showing the amplitudes of trace segments as a function of the angle of incidence in a given section of the subsurface.

DETAILED DESCRIPTION OF THE INVENTION

Figure 1:
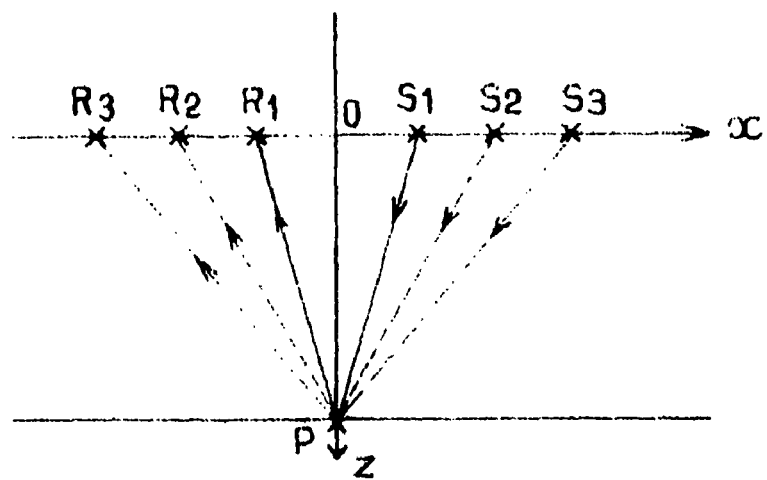
FIG. 1 shows diagrammatically the paths of seismic waves propagating between source-receiver pairs having the same common mid-point.

On FIG. 1, a set of sources S1, S2, S3 is shown together with a set of receivers R1, R2, R3 set at ground level. The source-receiver pairs (S1, R1), (S2, R2), (S3, R3) have a common mid-point O. It is supposed that the subsurface is formed of a series of horizontal layers delimited by interfaces. In this figure, the receivers R1, R2, R3 record a same event corresponding to a reflection at the level of a minor point P on a subsurface interface, with different slants (offsets).

Figure 2:
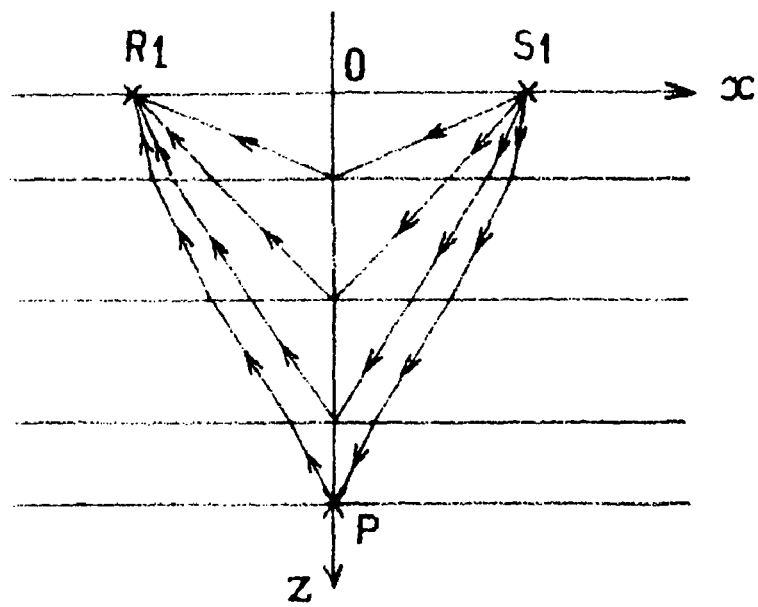
FIG. 2 shows diagrammatically the path of seismic waves propagating in the subsurface between a source and a receiver.

FIG. 2 shows diagrammatically the path of seismic waves propagating in the subsurface between a source S1 and a receiver R1 having mid-point O. At the time of a seismic acquisition, the source S1 is activated to generate seismic waves that propagate in the subsurface. The seismic waves are reflected at the different interfaces and are recorded by the receiver R1. The recording obtained by the receiver R1 contains signals corresponding to different events.

As shown in FIG. 2, during its propagation, a seismic wave undergoes deviations due to the variations in reflectivity of the subsurface interfaces as a function of the angle of incidence of the wave.

Figure 3:
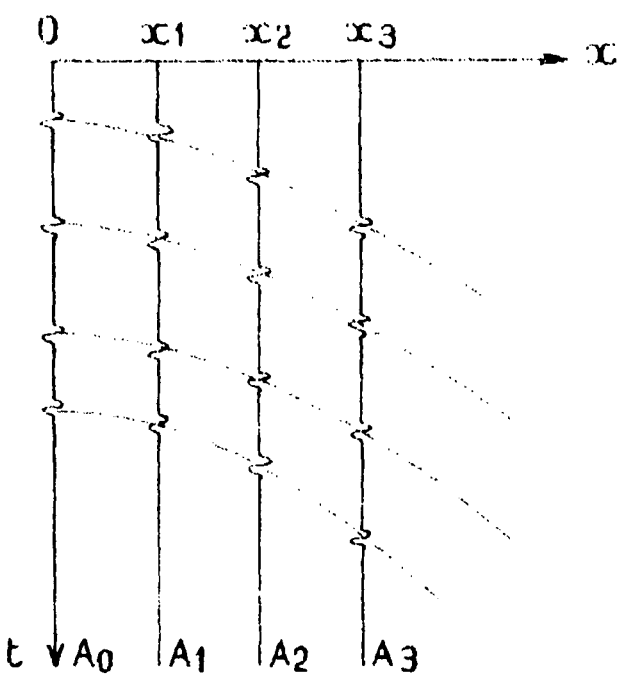
FIG. 3 shows diagrammatically a common mid-point collection of seismic traces.

FIG. 3 shows diagrammatically the seismic traces $A_0$, $A_1$, $A_2$, $A_3$ of amplitudes $a_0$, $a_1$, $a_2$, $a_3$ recorded over time by receivers located in abscissae $0$, $x_1$, $x_2$ and $x_3$. The traces are grouped into a common mid point collection. Each trace is associated with a given offset and consequently with a given slant.

The traces $A_0$, $A_1$, $A_2$, $A_3$ contain signals corresponding to identical events. Nonetheless, these signals are recorded at variable times t as a function of the offset x.

Figure 7:
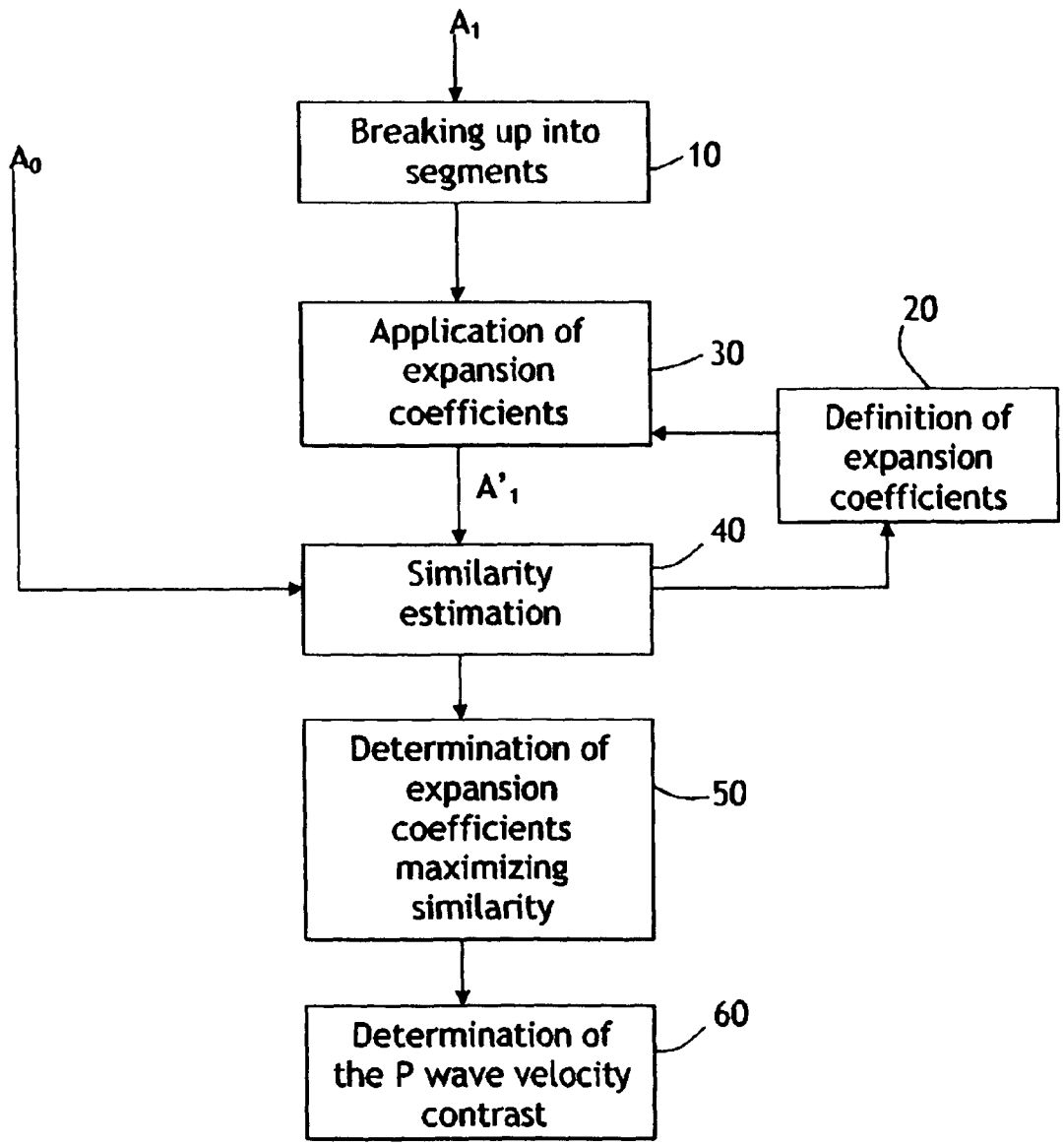
FIG. 7 is a flow chart showing diagrammatically the different steps of a method for processing seismic data according to a first embodiment of the invention.

FIG. 7 is a diagram illustrating the different steps of a processing method according to a first embodiment of the invention A collection of traces is considered comprising traces $A_0$, $A_1, A_2, \ldots A_N$ ranged by increasing offset $0, x_0, x_1, x_2, \ldots x_N$ (or increasing slant).

Figure 4:
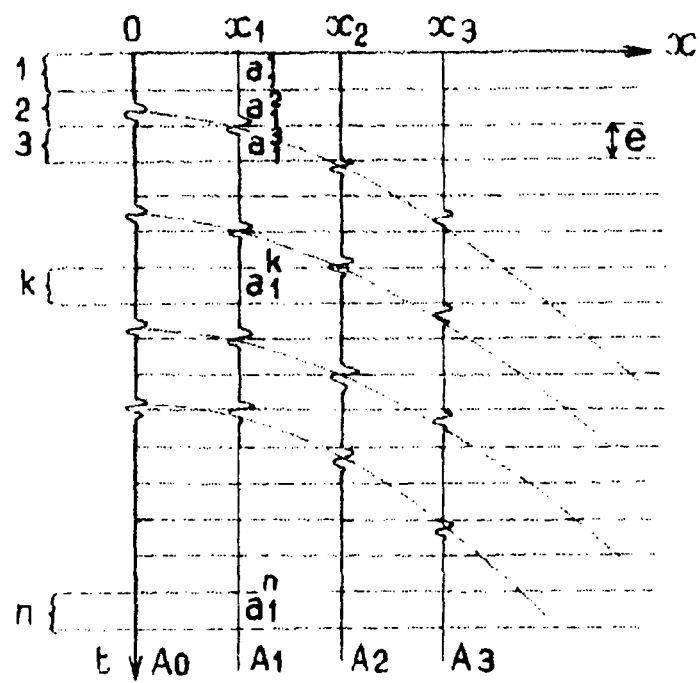
FIG. 4 shows diagrammatically the breaking up of traces from the collection of traces into a series of trace segments according to a predetermined segmentation interval.
Figure 5:
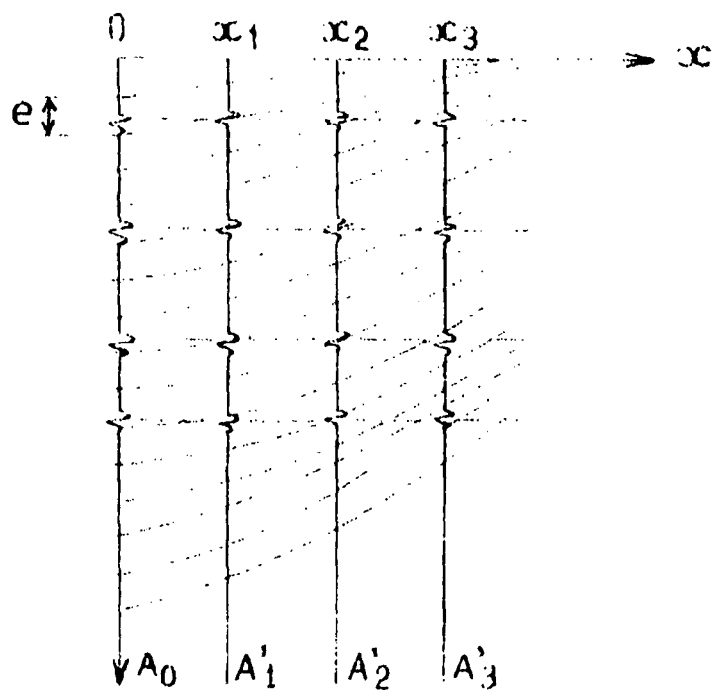
FIG. 5 shows diagrammatically the traces obtained after correction through application of expansion coefficients.
Figure 6:
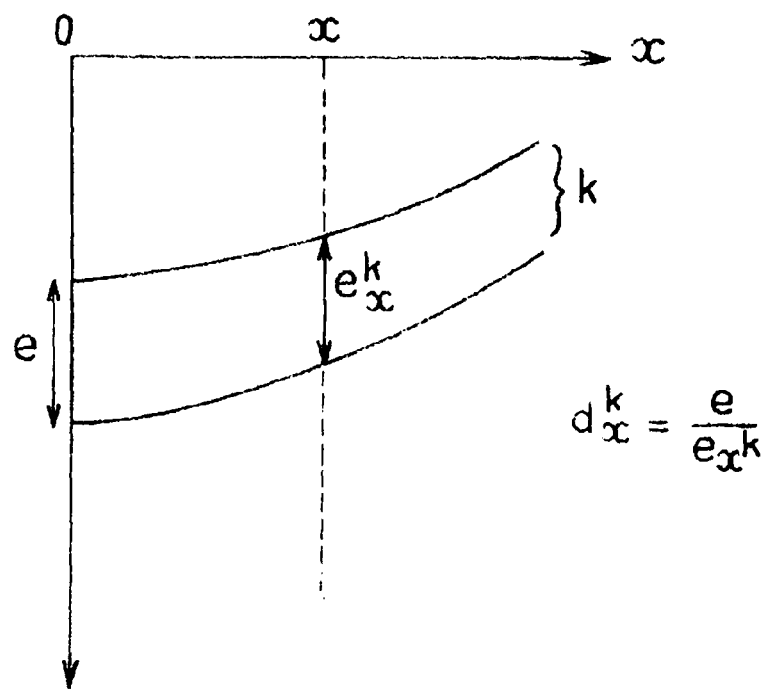
FIG. 6 shows diagrammatically the expansion of a trace segment.

According to a first step 10 (shown in FIG. 4), the trace $A_1$ of offset $x_1$ is broken up into n trace segments $A_1^1, A_1^2, A_1^3, \ldots A_1^n$ of amplitudes of $a_1^1, a_1^2, a_1^3, \ldots a_1^n$ according to a predetermined segmentation interval e. The segmentation interval e can, for example, be chosen as a multiple of the sampling interval for recording seismic traces. Typically, in seismic acquisition, the sampling interval for recording traces is of the order of 2 to 4 milliseconds. The segmentation interval is chosen as a function of the subsurface image resolution one wishes to obtain and taking into consideration the calculation time this implies.

Breaking up the seismic traces by segments is equivalent to dividing the subsurface into n parallel horizontal sections or layers, each section having a thickness z corresponding to a propagation time e of the zero offset seismic wave (x=0).

According to a second step 20, a series of n expansion coefficients $d_1^1, d_1^2, d_1^3, \ldots d_1^n$ is defined, each expansion coefficient $$d_1^k$$

being associated with a segment $$A_1^k$$

of the first trace $A_1$.

The expansion coefficients $d_1^1, d_1^2, d_1^3, \ldots d_1^n$ are, for example, determined by a random or pseudo-random selection algorithm. The expansion coefficients are taken within predetermined ranges corresponding to the orders of expansion generally found.

According to a third step 30, the associated expansion coefficient $$d_1^k$$

determined in the preceding step is applied to each segment $$A_1^k$$

of the first trace $A_1$. Thus one obtains a first expanded $A_1'$ with amplitude $a_1'$.

According to a fourth step 40, the first expanded trace $A_1'$ is compared with the reference trace $A_0$ with zero offset (or zero slant) to evaluate their similarity.

For this, the correlation product of traces $A_1$ and $A_0$ can be determined.

It is also possible to calculate a cost function F of the type:

$$F = \sum_{k=0}^{N} (a_1^k - a_{1'}^k)^2 \quad [1]$$

The correlation product or the cost function is a measure of the similarity between traces $A_1'$ and $A_0$.

Next, the second, third and fourth steps 20, 30, and 40 are repeated with a new series of expansion coefficients. The expansion coefficients are again determined by the random or pseudo-random selection algorithm.

According to a fifth step 50, on the basis of comparisons carried out with the different series of expansion coefficient, a series of expansion coefficients $d_1^1, d_1^2, d_1^3, \ldots d_1^n$ is determined which maximizes the resemblance between the first expanded trace $A_1'$ and the reference trace $A_0$. In order to do this, a Monte Carlo non-linear optimisation method is used such as, for example, a simulated annealing method.

The offset correction method just described is applied to each of the traces $A_1, A_2, \ldots A_N$ of the seismic trace collection according to increasing order of slant (or offset). This method leads to a corrected collection of traces $A_1', A_2', \ldots A_N'$ being obtained. According to a possible embodiment mode of the invention, each trace $A_{j+1}$ is corrected taking a reference trace the corrected trace $A_j'$ of an offset immediately below trace $A_{j+1}$ in the collection of seismic traces.

According to this embodiment, the traces of the trace collection are corrected one after the other, which leads to determination of an associated series of expansion coefficients $d_j^1, d_j^2, \ldots d_j^n$ for each trace $A_j$.

Figure 8:
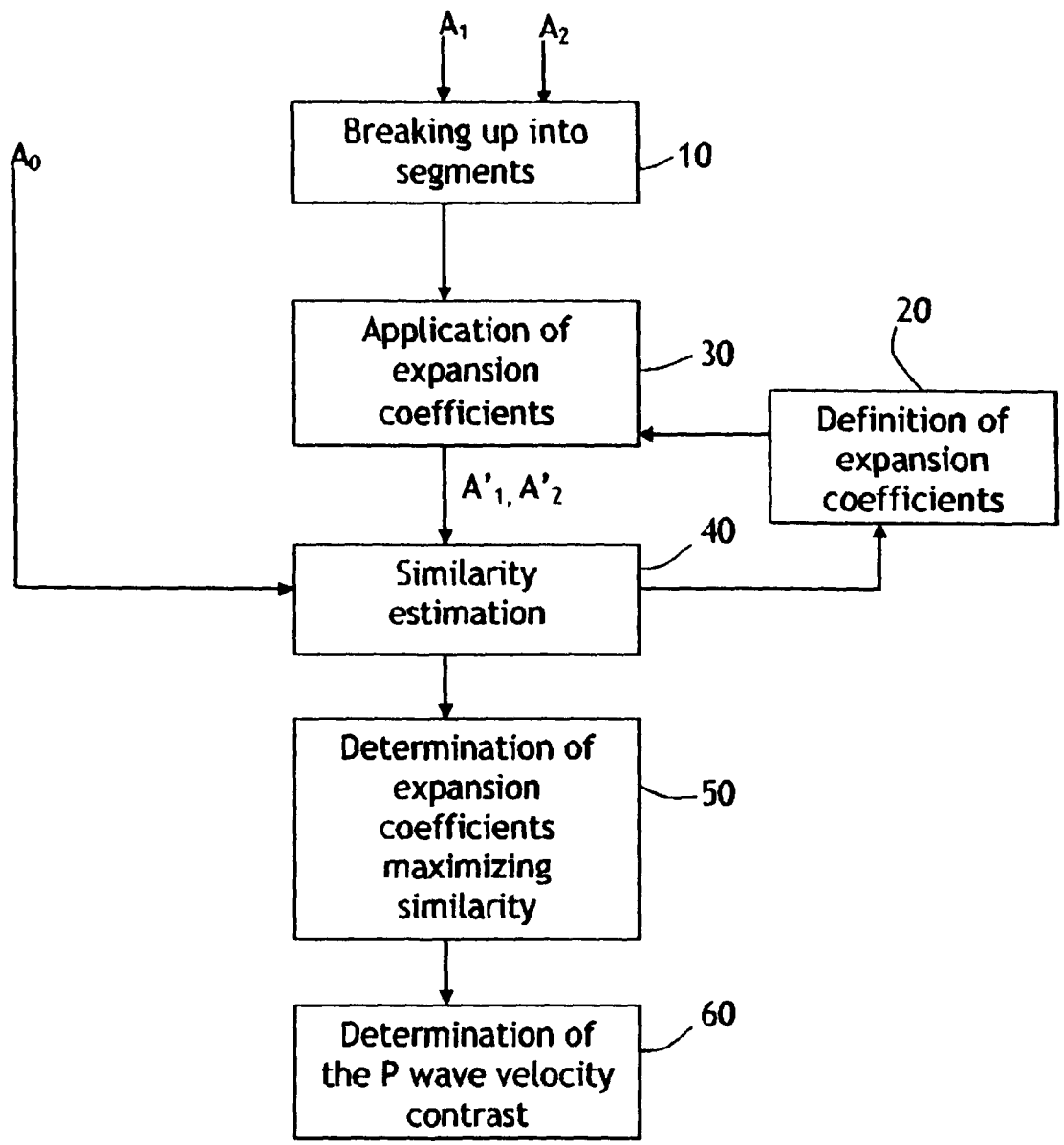
FIG. 8 is a flow chart showing diagrammatically the different steps of a method for processing seismic data according to a second embodiment of the invention.

FIG. 8 illustrates a second embodiment mode of the processing method whereby two traces are corrected simultaneously. In this variant, the expansion coefficients are determined for two traces $A_1$ and $A_2$ or for a partial sum of two traces.

This second embodiment mode makes it possible to take into account the amplitude of the traces and consequently the trace amplitude variation as a function of the offset or slant (AVO).

The fourth step 40 is then modified to calculate a cost function F of the type:

$$F = \sum_{k=0}^{n} \left( \left( \frac{\sin^2(arcos(1/d_1^k))}{\sin^2(arcos(1/d_2^k))} \right) - \left( \frac{a_{1'}^k - a_0^k}{a_{2'}^k - a_0^k} \right) \right)^2 \quad [2]$$

In so-called AVO analyses, one can benefit from the AVO phenomenon (Amplitude Versus Offset). Knowledge of the amplitude of a reflected wave as a function of the incidence angle of the reflection makes it possible to extract richer information about the elastic properties of rocks on either side of an interface, which normal reflectivity alone does not furnish.

According to a possible embodiment mode of the invention, the traces $A_{j+1}$ and $A_{j+2}$ are corrected taking as reference trace the corrected trace of $A_j'$ of an offset immediately below trace $A_{j+1}$ in the seismic traces collection.

The fourth step 40 consists of calculating a cost function F of the type:

$$F = \sum_{k=0}^{n} \left( \left( \frac{\sin^2(arcos(1/d_{j+1}^k))}{\sin^2(arcos(1/d_{j+2}^k))} \right) - \left( \frac{a_{j+1'}^k - a_{j'}^k}{a_{j+2'}^k - a_{j'}^k} \right) \right)^2 \quad [3]$$

wherein $d_{j+1}^k$ and $d_{j+2}^k$ are expansion coefficients associated with the k-th segments of traces $A_{j+1}$ and $A_{j+2}$, $a_j^{k'}, a_{j+1}^{k'}$ and $a_{j+2}^{k'}$ are the amplitudes of the k-th segments of the corrected traces $A_j', A_{j+1}'$ and $A_{j+2}'$.

The cost function F estimates the similarity between the corrected traces $A_{j+1}'$ and $A_{j+2}'$ with the trace $A_j'$ being taken as reference trace.

Figure 9:
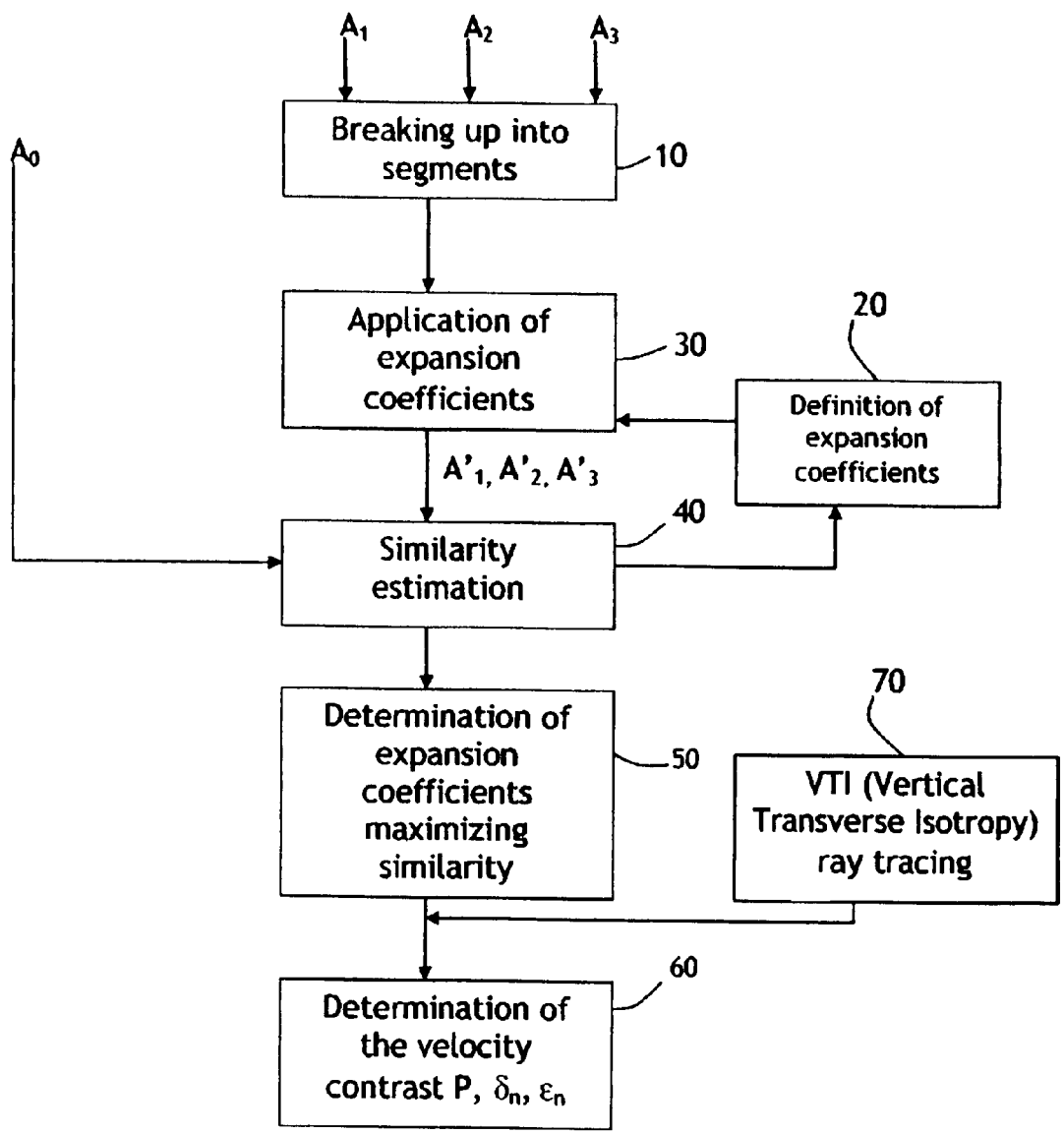
FIG. 9 is a flow chart showing diagrammatically the different steps of a method for processing seismic data according to a third embodiment of the invention.

FIG. 9 illustrates a third embodiment mode for the processing method whereby three traces are corrected simultaneously. In this variant, the expansion coefficients are determined simultaneously for three traces $A_1$, $A_2$ and $A_3$.

This third embodiment mode makes it possible to take into account the effect of anisotropy VTI (Vertical Transverse Isotropy) of the subsurface.

Calculation in the first section compares the three slanted times to propagation in the section k, $T_{A1}$, $T_{A2}$ and $T_{A3}$ with the vertical time $T_{A0}$ and provides the three following parameters:

the vertical velocity $v_{k0}$.

the Thomsen anisotropy parameters $\epsilon_k$ and $\delta_k$. According to a possible embodiment mode of the invention, the traces $A_{j+1}$, $A_{j+2}$ and $A_{j+3}$ are corrected taking as reference trace the corrected trace $A_j'$ of an offset immediately below the trace $A_{j+1}$ in the seismic traces collection.

The offset correction method makes it possible to deduce information about the properties of the subsurface with greater resolution than with methods of prior art. In particular, it becomes possible to deduce the following parameters:

the local P wave velocity contrasts,
the density contrasts in the subsurface,
the S wave velocity contrasts,
the anisotropy parameters (vertical velocity $v_{P0}$ and $\epsilon_k$ and $\delta_k$ parameters).

1/Determination of Local P Wave Velocity Contrasts

As shown on FIG. 10, the subsurface is considered as formed of n parallel and isotropic sections, with vertical travel time ke, (k=1 . . . n) corresponding to the segmentation interval for the trace $A_0$ with zero slant.

One notes the angle of incidences $i_{xkn}$ at the base of the section k for a wave emitted by a source at offset x reflecting at the base of section n.

According to a first step, the travel time of a wave is determined between the source at offset x and the base of the section of order n at normal incidence.

According to a second step, the average propagation velocity vp of the wave is determined between the source at offset x and the base of the section or order n at normal incidence.

Knowing the travel time between the source and each interface for each of the traces, it is possible to calculate the average propagation velocity of the wave for each trace.

For each section 1 to n, the angle $i_{xnn}$ is determined by the relation:

$$d_{xn} = \frac{1}{\cos(i_{xnn})} \quad [4]$$

The velocities and the angles of incidence satisfy the relation:

$$\frac{\sin(i_{xnk})}{v_{Pk}} = \frac{\sin(i_{xnq})}{v_{Pq}} \text{ for any } k \text{ and } q \text{ sections} \quad [5]$$

According to a third step, a complete ray tracing is made between each source and the zero offset point with a depth:

$$z = e\left(\sum_{k=0}^{n} v_{Pk}\right) \quad [6]$$

where $v_{P_k}$ satisfies the refraction law $$\frac{v_{Pk}}{v_{Pk-1}} = \frac{\sin(i_{1nk})}{\sin(i_{1nk+1})}.$$

Thus, $$\frac{dv_{Pk}}{v_{Pk}}$$

is deduced for each section k, k=1 . . . n.

According to a fourth step, the P wave is determined for each section k, k=1 . . . n from the relation:

$$\frac{dv_{Pk}}{v_{Pk}} = 2\frac{v_{Pk} - v_{Pk-1}}{v_{Pk} + v_{Pk+1}} \quad [7]$$

2/Determination Subsurface Density Contrasts

The density contrasts are obtained by subtracting the velocity contrasts from the velocity coefficients of reflection coefficients with incidence zero. Since it is known how to calibrate the seismic samples, it suffices to subtract the velocity contrasts from the zero incidence trace with a suitable calibration coefficient (F factor).

For each section $$k, k = 1 \ldots n, \frac{dv_{Pk}}{v_{Pk}}$$

is known resulting from the sequence of P wave velocities determined in accordance with 1/.

According to a first step, the density contrast $$\frac{dv_{\rho k}}{v_{\rho k}}$$

is determined for each section k, k=1 . . . n.

In order to do this, a sequence of density contrasts $$\frac{d\rho 1}{\rho 1}, \frac{d\rho 2}{\rho 2}, \ldots \frac{d\rho n}{\rho n}$$

is defined and the sum $$\frac{dv_{Pk}}{v_{Pk}} + \frac{d_{\rho k}}{\rho k}$$

is calculated. The similarity between $$\frac{dv_{Pk}}{v_{Pk}} + \frac{d_{\rho k}}{\rho k}$$

and the zero offset $A_0$ trace is measured. Further density contrasts are swept to obtain maximum similarity.

For example, the density contrasts $$\frac{d\rho 1}{\rho 1}, \frac{d\rho 2}{\rho 2}, \ldots \frac{d\rho n}{\rho n}$$

are determined by a random or pseudo-random selection algorithm. The density contrasts are taken initially from the predetermined ranges corresponding to orders of magnitude for the density contrasts generally observed. For example, initially it is possible to choose a series of density contrasts such that for any segment $$k, \frac{d_{\rho k}}{\rho k} = 2,7.$$

The similarity is, for example, measured by calculating the correlation product:

$$a_0^k \otimes \left( \frac{dv_{Pk}}{v_{Pk}} + \frac{d_{\rho k}}{\rho k} \right) \qquad [8]$$

The sequence $$\frac{d\rho 1}{\rho 1}, \frac{d\rho 2}{\rho 2}, \ldots \frac{d\rho n}{\rho n}$$

is selected, leading to maximum similarity between $$\frac{dv_{Pk}}{v_{Pk}} + \frac{d_{\rho k}}{\rho k}$$

for the trace $A_0$.

According to a second step, the factor F is educed as:

$$F = \frac{\left( \frac{dv_{Pk}}{v_{Pk}} + \frac{d\rho_k}{\rho_k} \right)moy}{2 \times (a_0^k)moy} \qquad (9)$$

where $_{moy}$ designates the average value.

The factor F is such that the products of F with the segments $a_0^k$ of the zero offset trace $A_0$ are equal to the reflection coefficients in the seismic band.

3/Determination of Local S Wave Velocity Contrasts

According to a first step, a gradient G of AVO amplitude is determined for the corrected seismic traces $A_0$, $A_1$, '$A_2$', ... $A_N$' as a function of the angle of incidence of the wave at the base of section k.

For traces $A_0$, $A_1$, '$A_2$', ... $A_N$' FIG. 11 is a diagram showing the amplitude $a_j^k$ of the j-th corrected trace $A_j$' as a function of $\sin^2(i_{xjkn})$, $i_{xjkn}$ being the angle of incidence at the base of section k of a wave emitted by a source at the offset $x_j$ reflecting on the base of the section n.

The amplitude $a_j^k$ is a linear function of $\sin^2(i_{xjkn})$. From this, it is possible to deduce an estimate of the amplitude gradient $G^k$ as the slope of a linear function.

Moreover, the amplitude gradient $G^k$ in the section k verifies the following relation:

$$v_{Sk} = \frac{v_{Pk}}{2} \times \frac{\frac{dv_{Pk}}{v_{Pk}} - 2G^k}{\left( 2\frac{dv_{Sk}}{v_{Sk}} + \frac{d_{\rho k}}{\rho k} \right)^{1/2}} \qquad (10)$$

where $v_{pk}$ is the P wave velocity, Pk is the acoustic impedance of the subsurface and $v_{Sk}$ is the S wave velocity, in section k.

$$\frac{dv_{Pk}}{v_{Pk}} = 2\frac{v_{Pk} - v_{Pk-1}}{v_{Pk} + v_{Pk+1}}$$

$$\frac{dv_{Sk}}{v_{Sk}} = 2\frac{v_{Sk} - v_{Sk-1}}{v_{Sk} + v_{Sk+1}}$$

The relation (10) is equivalent to:

$$2Gk = \frac{dv_{Pk}}{v_{Pk}} \times 2\left(\frac{v_{Pk}}{v_{Sk}}\right)^2 \times \left( 2\frac{dv_{Sk}}{v_{Sk}} + \frac{d_{\rho k}}{\rho k} \right) \qquad (11)$$

According to a second step, knowing the gradients $G^k$, the P wave velocity contrasts $$\frac{dv_{Pk}}{v_{Pk}}$$

and the impedance contrasts $$\frac{d_{\rho k}}{\rho k}$$

in all the sections, $$\frac{dv_{Sk}}{v_{Sk}}$$

is deduced for each section k using the relation (11).

In order to do this, a sequence of velocities S $v_{S1}$, $v_{S2}$, ... $v_{Sn}$ is defined and the gradients are determined for k=1 ... n. The similarity between the gradient $G^k$ obtained by the relation (11) and the gradient $G^k$ estimated during the first step is measured. The S wave velocity sequences are swept to obtain maximum similarity between the gradients.

The S wave velocities $v_{S1}$, $v_{S2}$, ... $v_{Sn}$ are, for example, determined by a random or pseudo-random selection algorithm. The S wave velocities are taken initially within predetermined ranges corresponding to the orders of usual S wave velocity magnitudes. For example, initially it is possible to choose a series of S wave velocities such as $$v_{Sk} = \frac{v_{Pk}}{2}.$$

The similarity is measured, for example, by calculating the correlation product between gradients.

The sequence of S wave velocities, $v_{S1}, v_{S2}, \ldots v_{Sn}$ is determined, leading to maximum similarity between gradients.

4/Determination of Anisotropy Parameters in P Mode

Now it is assumed that the subsurface shows axial anisotropy around a vertical or anisotropic VTI (Vertical Transverse Isotropy) axis of symmetry. The angles of incidence $i_{xnk}$ of the waves no longer result directly from the expansions $d_1^1, d_1^2, d_1^3, \ldots d_1^n$.

The path of a seismic ray is not perpendicular to the wave front. The velocity all along a ray $v_r$ and the normal velocity at the wave front $v_h$ named the phase velocity can thus be distinguished.

In P mode, these velocities depend on the angle r between the ray and the axis of symmetry, or the angle h between the perpendicular to the wave front and the axis of symmetry. Thus one has:

$$v_r = v_{r0} \times (1 + \delta \sin^2 r \cos^2 r + \varepsilon \sin^4 r) \quad (12)$$

where $v_{r0}$ is the velocity of a ray at zero incidence.

$$v_h = v_{h0} \times (1 + \delta \sin^2 r \cos^2 h + \varepsilon \sin^4 h) \quad (13)$$

where $v_{h0}$ is the velocity of the perpendicular to the wave front at zero incidence. It is to be noted that, at zero incidence, the velocity all along a ray and the phase velocity are equal (with $v_{r0} = v_{h0}$).

Descartes law applies to the phase velocities $v_h$. This is why the ray tracing step is divided into sub-steps.

According to a first sub-step, $v_{hn}$ is determined from $v_{rn}$ for section n.

According to a second sub-step, $v_{hn+1}$ is calculated from Descartes law:

$$\frac{\sin(i_{nn})}{v_{h_n}} = \frac{\sin(i_{nn+1})}{v_{h_{n+1}}} \quad (14)$$

According to a third sub-step, $v_{rn+1}$ is determined from $v_{hn+1}$ by using the relation (15).

The fourth sub-step consists of determining the time or distance of propagation in the section n+1:

$$\tan h = \frac{\tan r}{1 + 2\delta + 4(\varepsilon - \delta)\sin^2 r} \quad (15)$$

The ray tracing step is applied simultaneously on at least three traces $A_k, A_{k+1}, A_{k+2}$ to determine $v_{Pk}$ at zero incidence x=0, $\epsilon_k$ and $\delta_k$.

The angles of incidence $i_{xnk}$ of the waves no longer depend simply on the expansions $d_1^1, d_1^2, d_1^3, \ldots d_1^n$. One has:

$$d_j^k = \frac{v_{P_{k-1}}}{v_{P_k} \times (\cos r_k + \sin r_k \times \tan(r_k - h_k))} \quad (16)$$

The same method for determining the anisotropy parameters can be applied to the case of a subsurface having axial anisotropy around an inclined axis or TTI anisotropy (Tilted Transverse Isotropy). In this case, it is necessary to take into account the dip of the sections.

The invention claimed is:

1. Method for processing with a processor seismic data comprising a collection of seismic traces with different offsets, comprising the steps of:
    a) breaking up a first trace representing physical events occurring in a subsoil of the collection of seismic traces into a series of trace segments according to a predetermined segmentation interval;
    b) defining a series of expansion coefficients, each expansion coefficient being assigned to a segment of the first trace;
    c) applying each expansion coefficient of the series of expansion coefficients to their assigned segments of the first trace to create an expanded first trace;
    d) comparing the expanded first trace with a second trace from the collection of seismic traces to evaluate their similarity;
    e) repeating steps b), c), and d) with a new series of expansion coefficients, and
    f) determining with the processor an optimum series of expansion coefficients that maximizes the similarity between the first expanded trace and the second trace in order to obtain a corrected first trace of seismic data representing physical events occurring in the subsoil.

2. Method according to claim 1, wherein the predetermined segmentation interval is a multiple of the sampling interval for recording the first seismic trace.

3. Method according to claim 1, wherein the second seismic trace is a trace with zero offset of the seismic trace collection.

4. Method according to claim 1, wherein the second seismic trace is a trace of an offset immediately below the first seismic trace in the seismic trace collection.

5. Method according to claim 4, wherein the second seismic trace is itself a corrected trace.

6. Method according to claim 1, wherein the series of expansion coefficients at step b) is defined according to a random or pseudo-random selection algorithm.

7. Method according to claim 6, wherein the series of expansion trace is determined by a Monte Carlo method.

8. Method according to claim 1, wherein the comparison step d) includes correlation of the first expanded trace with the second trace.

9. Method according to claim 1, wherein step d) includes determination of a cost function evaluating a similarity between the first expanded trace and the second trace.

10. Method according to claim 1, wherein steps a) to f) are applied to each trace or group of traces from the seismic trace collection, to obtain a corrected collection of traces.

11. Method according to claim 1 wherein steps a) to f) are applied according to increasing order of skew of the traces.

12. Method according to claim 9, furthermore including a step of:
    deducing a propagation velocity of a seismic P wave in a subsurface as a function of depth from the optimum expansion coefficient series associated with each trace.

13. Method according to claim 12, wherein the step g) includes a ray tracing sub-step.

14. Method according to claim 13, including a step of:
    deducing the density contrast data of the subsurface as a function of depth.

15. Method according to claim 14, including a step of:
    deducing a propagation velocity of a seismic S wave as a function of depth.

16. Method according to claim 1, including a step consisting of:

deducing the anisotropy parameters of a subsurface from the series of optimum expansion coefficients associated with a plurality of traces.

17. An inversion method for processing in a processor seismic data comprising a collection of seismic traces having different offsets, the method comprising the steps of:

a) breaking up a first trace of the collection of seismic traces into a series of trace segments according to a predetermined segmentation interval;

b) defining a series of expansion coefficients, each expansion coefficient being assigned to a segment of the first trace;

c) applying the associated expansion coefficient to each segment of the first trace;

d) comparing the first trace thus expanded with a second trace from the collection of seismic traces to evaluate their similarity;

e) repeating steps b), c), and d) with a new series of expansion coefficients;

f) determining in the processor an optimum series of expansion coefficients that maximizes the similarity between the first expanded trace and the second trace in order to obtain a corrected first trace; and g) deducing from this corrected first trace the values of propagation velocities of seismic waves as a function of depth in a subsurface.

\* \* \* \* \*

UNITED STATES PATENT AND TRADEMARK OFFICE
CERTIFICATE OF CORRECTION

| | | |
|---|---|---|
| PATENT NO. | : 8,103,452 B2 | Page 1 of 1 |
| APPLICATION NO. | : 11/792566 | |
| DATED | : January 24, 2012 | |
| INVENTOR(S) | : Garotta | |

It is certified that error appears in the above-identified patent and that said Letters Patent is hereby corrected as shown below:

On the Cover page, item (57), under "ABSTRACT", in Column 2, Line 12, delete "b), and" and insert -- b), c) and --, therefor.

In Column 4, Line 42, delete "minor" and insert -- mirror --, therefor.

In Column 6, Lines 16-19, delete "According to ........ traces." and insert the same at Line 20, as a new paragraph.

In Column 7, Lines 13-17, delete "According to ........ collection." and insert the same at Line 18, as a new paragraph.

In Column 11, Lines 7-9, delete "The angles ........ $d_1^n$." and insert the same at Line 10, as a new paragraph.

In Column 12, Line 43, in Claim 7, delete "expansion" and insert -- expansion coefficients maximizing the similarity between the first expanded trace and the second --, therefor.

In Column 13, Lines 1-2, in Claim 16, delete "step consisting" and insert -- step --, therefor.

Signed and Sealed this
First Day of May, 2012

David J. Kappos
*Director of the United States Patent and Trademark Office*